Feb. 28, 1961

G. WIGGERMANN 2,972,899

MECHANICAL POWER CONVERTER OF VARIABLE TRANSMISSION RATIO

Filed April 27, 1956

Feb. 28, 1961
G. WIGGERMANN
2,972,899
MECHANICAL POWER CONVERTER OF VARIABLE
TRANSMISSION RATIO
Filed April 27, 1956
2 Sheets-Sheet 2
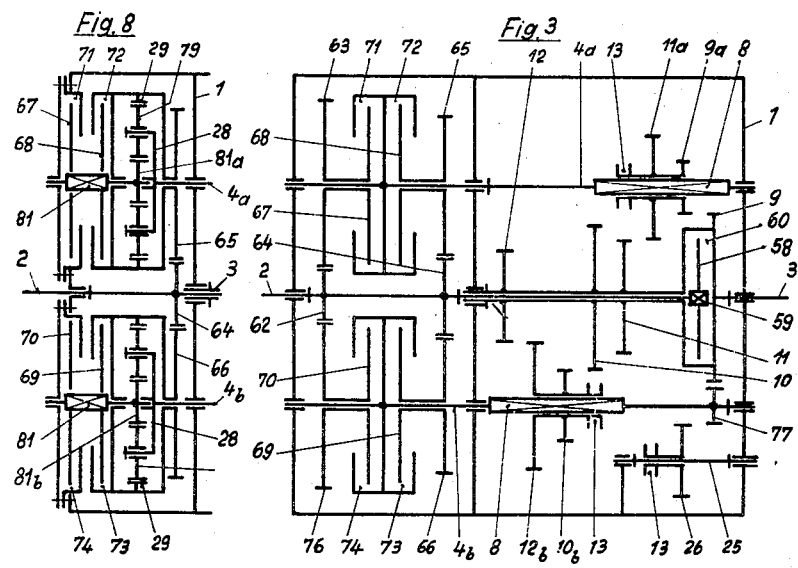
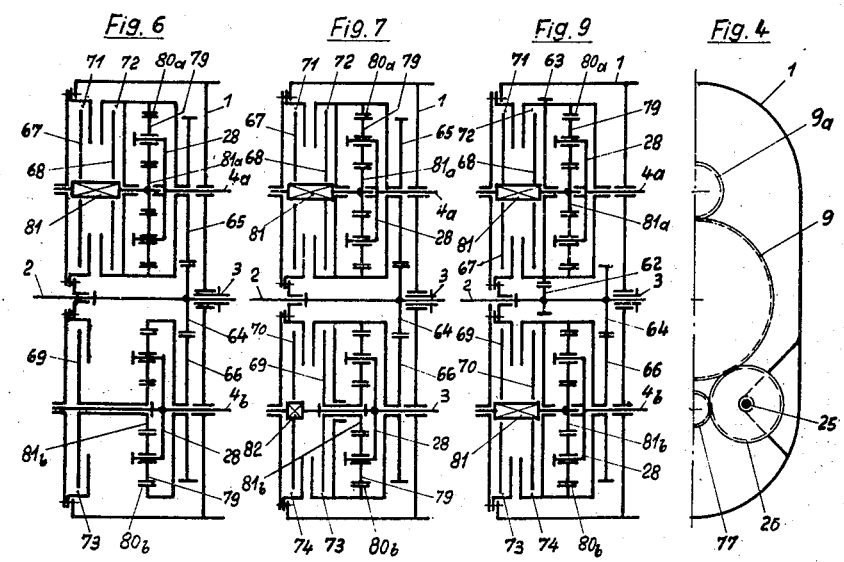

United States Patent Office 2,972,899
Patented Feb. 28, 1961

2,972,899
MECHANICAL POWER CONVERTER OF VARIABLE TRANSMISSION RATIO

Georg Wiggermann, Spitzgartenweg 10, Kressbronn, Germany, assignor of one-half to Walter Reiners, M. Gladbach, Germany Filed Apr. 27, 1956, Ser. No. 581,112

11 Claims. (Cl. 74—329)

My invention relates to a mechanical power converter of variable transmission ratio and, more particularly, to a converter wherein a stepped speed-change mechanism of constant graduation between steps has a plurality of alternately active counter shafts driven from the converter input shaft through an auxiliary gear mechanism of continuously variable transmission ratio which permits controlling the counter shafts so that the ratio of their respective speeds varies between 1:1 and $1:c$, the value $c$ being equal to the constant graduation factor of the stepped speed-change mechanism that transmits power from the counter shafts to the output shaft of the converter. A mechanical power converter of this type is disclosed in my copending application Serial No. 529,091, filed August 18, 1955.

A converter of this type affords reliable and smooth switching under any operating conditions and without interruption in the flow of transmitted power. By virtue of the coaction between the auxiliary mechanism and the speed-change mechanism proper and by means of the plural arrangement of counter shafts which provides for a plurality of trains of power transmission between converter input shaft and output shaft, the shifting between gear steps in the speed-change mechanism can always be performed at a counter shaft that does not transmit power at that time and the spur gears then being placed into meshing engagement are already "synchronized" to run at the same peripheral speed. Such a gear-shifting operation, occurring with synchronized gear members on a mechanically not loaded counter shaft affords most reliable performance and also offers the possibility of shifting directly by means of axially displaceable gears rather than requiring the use of additional coupling or clutching elements in the speed-change mechanism proper.

A converter as disclosed in my above-mentioned copending application has the further advantage of operating as a torque converter during the intervals of gear-shifting operations. However, for many practical purposes it is mainly desired to provide for reliable and comfortable switching between gear steps, regardless of whether or not power losses may occur during the switching intervals. For achieving this aim, it is mainly necessary to have the auxiliary mechanism secure reliable synchronism as regards the peripheral speed of the gear members about to mesh with each other, whereas it is less important or not necessary to maintain true torque-converting performance during the switching operation.

Based upon this recognition, it is an object of my present invention to provide a mechanical power converter of variable transmission ratio which affords a simpler design than the converters previously disclosed but nevertheless secures an equally reliable performance as regards smooth switching between converter steps under all occurring load conditions.

To this end, and in accordance with one of the features of the present invention, I provide the auxiliary mechanism in a converter of the above-mentioned type with a number of spur-gear drives that are actuated from the converter input shaft and I further provide controllable clutches that connect these drives with at least two counter shafts of the graduated speed-change mechanism. Relative to one or both of the counter shafts the spur-gear drives form two alternately operable power connections whose respective transmission ratios are graduated relative to each other in accordance with the same constant graduation factor "$c$" as existing between the individual gear steps of the speed-change mechanism. The controllable clutches of the auxiliary mechanism are of the slippage or friction type for gradual accelaration or deceleration of the driven clutch member.

According to another feature of the invention, I further provide a direct drive between converter input shaft and output shaft by means of a controllable friction clutch coaxially disposed between the two shafts. For best utilization of space and minimum expenditure in components, this clutch is arranged on the largest main spur gear on the output shaft of the speed-change mechanism, and the graduation of the transmission ratios obtaining between the respective steps of the speed-change transmission is such that the direct drive forms the highest-speed gear step of the entire mechanism.

In a converter according to the invention, the switching from any one gear step to the other occurs always in a train of transmission which is not under load at that time, and the counter-shaft gear next to become active is first driven up to accurate or nearly accurate peripheral synchronism with the correlated main gear on the output shaft. In order to prevent switching tooth upon tooth, the teeth of the respective gears are preferably given sufficient clearance in the direction of rotation and the lateral edges of the teeth are preferably somewhat bevelled or rounded so that the two gears can be placed into meshing engagement even when they are both running in accurate synchronism with each other.

According to another feature of the invention, the transmission ratios of the speed-change mechanism and of the auxiliary gear mechanism are so rated relative to each other that only an approximate but not perfect synchronism occurs. This obviates the possibility that a tooth of one gear may continuously register with a tooth of the other gear to be placed in mesh, thus excluding the possibility of appreciable shocks occurring during gear switching.

As will be explained below, a power converter according to the invention may either operate in two-cycle performance during gear shifting, or it may operate in single cycle. Relative to two-cycle converters, and according to another feature of my invention, the auxiliary gear mechanism for driving one of the counter shafts from the input shaft is provided with two alternately operable driving transmissions, whereas the connection of the other counter shaft with the input shaft is effected by only one driving transmission. Relative to converters of single-cycle operation, and in accordance with another feature of my invention, I provide two alternately operable drives between each of the two counter shafts and the converter input shaft. By virtue of the double transmission between the converter input shaft and one or two counter shafts, the change in revolving speed of these counter shafts can be effected simply by alternately actuating the appertaining two friction clutches. This is particularly important when the clutches are active in the direct train of power transmission between input shaft and output shaft because then the use of such alternately active clutches minimizes in a simple manner the occurring interruption in power flow.

Such clutches must be capable of transmitting a considerable torque, and for that reason require correspondingly large dimensions. According to another feature of my invention, however, the dimensions of the clutches are reduced by applying a design which subjects these clutches to only a small portion of the total torque to be transmitted. According to this design, a planetary or other differential gearing is inserted into the driving connection between the converter input shaft and the respective counter shafts. The gearing has its voltage bridge member, carrying the planet gears, in permanent connection with the correlated counter shaft, whereas the orbit gear is mechanically in connection with the converter input shaft, and the sun gear is selectively connectible by means of a controllable friction clutch either with the bridge member or with the orbit gear. When the clutch is open, the sun gear can freely revolve so that bridge member and counter shaft stand still even when the orbit gear is being driven. When closing the clutch, the rotation of the gears is arrested, the planetary gearing is locked within itself, and the counter shaft is driven by the permanently intermeshing connecting gears from the converter input shaft.

Planetary gearings are particularly favorable for varying the counter-shaft speed as required for the gear-shifting operations of the speed-change mechanism. For this purpose, according to another feature of my invention, the sun gear of the above-mentioned planetary gearings is controlled through two selectively operable friction clutches. One of two clutches, when effective, connects the sun gear with one of the two other members of the planetary gearing, namely with the orbit gear or the bridge member. The other friction clutch, when effective, connects the sun gear with the stationary converter housing. With such a design, it is only necessary to alternately actuate the two clutches for changing the transmission ratio in the auxiliary mechanism as required for the gear-switching operation. It is advantageous to have the power-transmitting planetary gearing locked within itself during most of the operative time of the converter, so that this gearing does not produce noise or frictional losses and is not subjected to wear.

For many applications, for instance when using the converter in a vehicle drive, at least one reversing gear is required. According to a further feature of my invention, reversing is provided for by having the smallest counter gear of the speed-change mechanism selectively engageable with an intermediate spur gear which simultaneously meshes with the largest main gear on the converter output shaft and is placed in operation by axial displacement. When the intermediate gear is effective, it causes the converter output shaft to revolve in the reverse direction.

It is often important, for instance in automotive vehicles, to readily permit maneuvering between forward and reverse. A converter according to the invention lends itself with particular ease to such maneuvering. To this end, during gear switching, the above-mentioned reversing mechanism is effective in cooperation with one of the two counter shafts controlled by the auxiliary gear mechanism, while at the same time the other counter shaft co-operates with the lowest-speed forward gear pair of the speed-change mechanism. By such an arrangement, any desired smooth reversal in the revolving direction of the converter output shaft can be obtained simply by alternating actuation of the friction clutches through which the counter shafts are being driven, without the necessity of changing any meshing engagement between the spur gear of the speed change mechanism. That is, the reversal is effected only by virtue of the friction clutches so that excessive shocks and appreciable interruption in power flow are avoided.

In order to obtain a momentary standstill during gear shifting from forward to reverse and vice versa, my invention further provides means for arresting at least one of the counter shafts relative to the converter housing by means of another friction clutch.

The foregoing and other objects, advantages and features of my invention will be apparent from, and will be mentioned in, the following description of the embodiments illustrated by way of example on the accompanying drawings.

Fig. 3 is a longitudinal sectional view of another converter,

Fig. 4 shows a partial cross section of the same converter, the section being taken substantially in the plane of the largest main of the converter shown in Fig. 3.

Figs. 6 to 9 illustrate in longitudinal section four respective embodiments of auxiliary gear mechanisms applicable with converters otherwise in accordance with Figs. 1 to 5, the mechanisms of Figs. 6 to 9 being all provided with planetary gearings.

Figure 1:
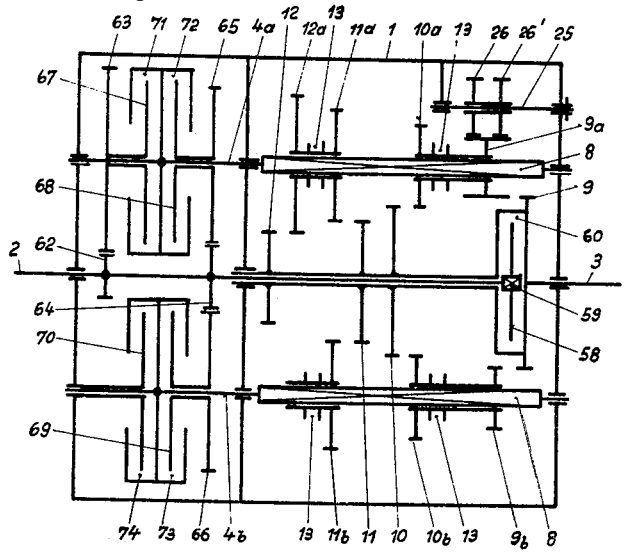
Fig. 1 shows schematically a longitudinal sectional view of a converter.

In all illustrations, the same reference characters are used for functionally similar elements respectively. For ease of understanding and to prevent obscuring the illustrations by inessential matters, the customary gear shifting forks or gear-shift levers are not illustrated. In principle, the gear shifting can be performed by hand, although it will be understood that it is usually preferable to control the individual gear-shifting operations by means of a central control switch or master controller preferably operated automatically in accordance with a setting selected by the operator. The central control may operate with mechanical, electrical, pneumatic, hydraulic or other means, the type of operation being often dependent upon the type of the clutches chosen for a particular converter.

In all illustrated embodiments, the number of selectively operable gear pairs in the speed-change portion of the converter is chosen as four. This was done for simplifying an understanding of the converters as well as the following explanations, and also in order to readily permit a comparison between any of the illustrated embodiments. For the same reason, all embodiments are shown equipped in the same manner with friction-disc clutches, and these are symbolically shown as having only a single friction disc, although multiple-disc friction clutches, magnetic clutches or any other clutches may be used, provided they involve a friction principle, that is, dissipate power during periods of slippage between the driven and driving members of the clutch.

Figure 2:
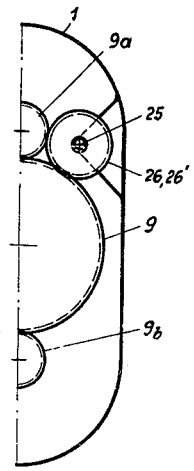
Fig. 2 is a partial cross section of the same converter, the section being taken in the plane of the largest main gear.

In the embodiment according to Figs. 1 and 2, the housing 1 of the converter is provided with bearings for journalling the converter input shaft 2 (I-shaft), the output shaft 3 (O-shaft), and two countershafts 4a and 4b (C-shafts). Shafts 2 and 3 are coaxially aligned. Shafts 4a and 4b are parallel to shafts 2 and 3. The counter shaft 4a has squared profile 8 on which two pairs of spur gears 9a, 10a and 11a, 12a are displaceably seated. The two gears of each pair are rigidly joined with each other to form a unit. The C-shaft 4b has a corresponding squared portion 8 on which a pair of rigidly interconnected C-gears 9b and 10b are displaceable. Likewise displaceable on this portion of shaft 4b is an individual C-gear 11b. All C-gears are non-rotatable relative to the appertaining C-shaft. Fixed on or by the O-shaft 3 are four coaxial main gears (M-gears) 9, 10, 11 and 12. M-gears have a graduated diameter and different numbers of teeth decreasing in the sequence just given. The C-gears designated by the same reference numeral (for instance, 9a and 9b) have the same number of teeth and can be axially shifted into and out of engagement with the M-gear designated by the same reference numeral (9). The individual C-gear 11b can be shifted into meshing engagement with M-gear 11 also by axial displacement.

The entire set of M-gear and C-gears forms a stepped speed-change mechanism of constant step ratio. That is, the transmission ratios of the gear steps represent a mathematical series of numbers which are all powers of the same base; the transmission ratios of any two adjacent gear pairs have a fixed quotient "$c$."

The direct connection between I-shaft 2 and O-shaft 3, required for "direct drive," is effected by means of a controllable friction clutch 60 whose clutch disc 58 is connected with the I-shaft 2 by means of a squared shaft portion 59. For good utilization of the available space, the clutch 60 is located in the vicinity of the largest M-gear, namely M-gear 9. The O-shaft 3, serving also as the main shaft of the speed-change mechanism, is partially hollow. The I-shaft 2 extends through hollow shaft 3 to the clutch 60.

To provide for reversing, the converter housing 1 is further equipped with a shaft 25 on which two spur gears 26 and 26', rigidly joined with each other, are rotatably mounted. The gears 26 and 26' are permanently in mesh with the C-gear 9a and, by means of axial displacement (toward the right in Fig. 1), can be placed into simultaneous meshing engagement with M-gear 9 (see Fig. 2).

The converter is provided with conventional gear-shift controls which have respective shifting forks (not illustrated) in engagement with an annular groove 13 of each pair of C-gears in order to impart to these gears the axial displacement required for gear-shifting operation. For the same purpose, an annular gap or groove (not illustrated) is provided between the reversing gears 26 and 26'. The transmission ratios of the speed-change mechanism are so chosen that the direct drive obtained through the clutch 60 represents an additional gear step.

The auxiliary mechanism for driving and speed-controlling the C-shafts is mounted within a separate portion of the converter housing 1. Between I-shaft 2 and C-shaft 4b, there are two driving connections which can be selectively placed in and out of operation by means of two friction clutches 71 and 72 mounted on the C-shaft 4a. When one of these driving connections is active, a spur gear 62 mounted on I-shaft 2 drives a spur gear 63 which is revolvably journalled on the C-shaft 4a and is non-rotatably jointed with the friction disc 67 of the clutch 71. When the other driving connection is in operation, a spur gear 64 mounted on I-shaft 2 drives a spur gear 65 which is likewise journalled on the C-shaft 4a but is non-rotatably joined with the disc 68 of the clutch 72. Only one controllable driving connection exists between I-shaft 2 and the other C-shaft 4b. This single driving connection is controlled by the clutch 73 mounted on the C-shaft 4b. When clutch 73 is closed, the spur gear 64 on I-shaft 2 drives a spur gear 66 which is journalled on the C-shaft 4b and is non-rotatably joined with the disc 69 of clutch 73. Another clutch 74 mounted on the C-shaft 4b has its disc 70 nonrotatably connected with the converter housing 1 and permits braking or locking the C-shaft 4b. For proper operation of the converter, it is important that the transmission ratios of the gear pairs 62/63 and 64/65 correspond accurately or nearly accurately to the ratio 1:$c$ which is also the step ratio of the speed-change mechanism, whereas the ratios of the gear pairs 64/65 and 64/66 have accurately or nearly accurately the ratio 1:1.

The operation of the speed-change mechanism will be described in the following with reference to a number of switching problems.

A. SWITCHING FROM IDLING THROUGH ALL GEAR STEPS TO DIRECT DRIVE

0. Starting condition

All C-gears are disengaged (out) as shown in Fig. 1. All friction clutches are open. I-shaft 2 is driven. C-gear 9a is "in" (i.e. in meshing engagement with M-gear 9).

1. Switching to first gear step

Close clutch 71. This connects I-shaft 2 with O-shaft 3 through the train 2—62—63—71—4a—9a—9—3. The two gear pairs 62, 63 and 9a—9 form a step-down transmission. O-shaft 3 runs at lowest (first) speed.

2. Switching through second gear step (a) Open clutch 71 and close clutch 72. This establishes a train of power transmission from I-shaft 2 through gear pair 64, 65 and thence through clutch 72 and gear pair 9a, 9 to O-shaft 3. Gear pair 64, 65 has a smaller transmission ratio than the gear pair 62, 63 previously effective. Hence, O-shaft 3 now runs at the next higher speed (second speed). Substantially simultaneously with the closing of clutch 72, clutch 73 is actuated and accelerates C-shaft 4b and C-gear 9b up to synchronism with C-shaft 4a and C-gear 9a. Then the synchronized C-gear 9b is shifted into M-gear 9. Now both C-shafts 4a and 4b are driven simultaneously from gear 64 on I-shaft 2 through respective gears 65 and 66, and both C-shafts temporarily transmit power from I-shaft 2 to O-shaft 3.

(b) Clutch 72 is opened and C-gear 9a is moved out of M-gear 9 so that now only the C-shaft 4b and C-gear transmit power in the train 2—64—66—73—4b—9b—9—3. Clutch 71 is actuated and accelerates C-shaft 4a and C-gear 10a from I-shaft 2 through gear 63 up to a rotary speed which is lower than that of active C-gear 9b (then driven through gears 64, 66) and corresponds to the rotary C-shaft speed of the first step. At that rotary speed, the peripheral speed of C-gear 10a is exactly or nearly equal to the then obtaining peripheral speed of M-gear 10. Now C-gear 10a is shifted into M-gear 10. Due to the synchronization previously effected, a smooth shifting is secured.

3. Switching through third gear (a) C-gear 9b moves out. Clutch 71 opens and clutch 72 closes. Clutch 72 now transmits power through C-gear 10a in the train 2—64—65—72—4a—10a—10—3 to run O-shaft at third speed. Clutch 73 is effective to drive C-gear 10b at the speed of C-gear 10a. C-gear 10b is moved in.

(b) C-gear 10a moves out so that the power transmission is through clutch 73 and C-gear 10b. Clutch 71 is actuated to make the now inactive C-shaft 4a run at a speed corresponding to peripheral synchronism of C-gear 11a with M-gear 11. C-gear 11a is moved in.

4. Switching through fourth gear (a) C-gear 10b moves out. Clutch 71 opens and clutch 72 closes to accelerate C-gear 11a in the power transmitting train 2—64—65—72—4a—11a—11—3. C-gear 11a now drives O-shaft 3 to run at fourth speed. Clutch 73 is actuated to accelerate C-gear 11b to the peripheral speed of M-gear 11. C-gear 11b is moved in.

(b) C-gear 11a moves out so that the power transmission is through clutch 73 and C-gear 11b. Clutch 71 closes to accelerate C-gear 12a. C-gear 12a moves in.

5. Switching through fifth gear

Clutch 73 opens. C-gear 11b moves out. Clutch 71 opens and clutch 72 closes. Power is now transmitted through clutch 72 and C-gear 12a. O-shaft 3 runs at fifth speed.

6. Switching to sixth gear

Clutch 60 closes, clutch 72 opens, gear 12a moves out. O-shaft 3 now runs at the same speed as I-shaft 2.

For simplifying the following explanations and to permit a simplified representation of further gear-switching operations and embodiments, the sequential steps of operation described in detail above are again presented in form of a tabulation. In the tabulation, as well as in all following ones, all clutches and gears are identified only by their respective reference characters and only those are indicated that are "in" at a time. Indicated in parentheses are the switching operations that occur outside of the then active train of power transmission, i.e. take place parallel or simultaneously with the operations in the power train. In each individual setting, only one friction clutch is active in the train of power transmission at a time, the other clutches are off with the exception of the one identified clutch that may have to supply a partial torque for the purpose of synchronizing the C-gear to be moved into active engagement.

TABLE A

0. Starting condition: All C-gears out, all clutches out, I-shaft 2 driven. (9a in.)

1. 71—9a=1st gear
2(a). 72—9a (9b in; synchronized by 73)=2nd gear
2(b). 73—9b (9a out; 10a in, synchronized by 72)=2nd gear
3(a). 72—10a (9b out; 10b in, synchronized by 73)= 3rd gear
3(b). 73—10b (10a out; 11a in, synchronized by 71)= 3rd gear
4(a). 72—11a (10b out, 11b in, synchronized by 73)= 4th gear
4(b). 73—11b (11a out, 12a in, synchronized by 73)= 4th gear
5. 72—12a=5th gear
6. 60=direct drive=6th gear

B. SWITCHING FROM DIRECT DRIVE THROUGH ALL GEAR STEPS TO IDLING 6. 60=6th gear
5. 72—12a=5th gear
4(b). 71—12a=4th gear
4(a). 73—11b (12a out, 11a in, synchronized by 72)= 4th gear
3(b). 71—11a (11b out; 10b in, synchronized by 73)= 3rd gear
3(a). 73—10b (11a out; 10a in, synchronized by 72)= 3rd gear
2(b). 71—10a (10b out; 9b in, synchronized by 73)= 2nd gear
2(a). 73—9b (10a out; 9a in, synchronized by 72)=2nd gear
1. 71—9a (9b out)=1st gear
0. 9a out=idling It is apparent from the foregoing tabulations that within a middle range of speed-changing transmission, wherein the switching operations characteristic for the mechanism take place, each gear change comprises two switching cycles (a) and (b), so that the mechanism can be said to perform a two-cycle operation. Only the first two and the last two gear steps are switched in a single cycle because then the change in transmission ratio is effected only by the alternating operation of the friction clutches. Such a simplification of the switching operation in the first and last gear steps is all the more desirable as these gear steps are those most often used in continuous operation.

As is further apparent from the above-mentioned examples of switching operations, the actuation of the gear change in the intermeshing members, namely the M-gears and the C-gears, occurs always on the one C-shaft which is not included in the train of power transmission at that time. Consequently, such gear shift never causes an interruption of the power transmission.

The switching operation performed under load at the torque-transmitting, alternately actuated clutches requires such a short-lasting interruption in the train of transmission that such interruption is practically negligible.

Consequently, a smooth and reliable gear-switching performance is secured under all load or driving conditions.

It is characteristic of the mechanism that its switching principle is in no way affected by increasing or diminishing the number of gear steps. The number of these steps depends only upon the number of the M-gears and the number of the C-gears meshing with the M-gears.

Due to the accurately defined range of power transmission required of the friction clutches, this range being determined by the magnitude or difference between the individual gear steps, these friction clutches can uniformly be given a relatively small size.

It is further very favorable that during operation of the mechanism only up to two C-gears of the same or adjacent gear steps are moved into meshing engagement so that oil splash losses remain slight; and that by virtue of designing the speed-change mechanism as a slide-gear mechanism, the inactive gears do not run idle at a speed greatly exceeding that of their normal operation. For that reason, large total ranges of transmission can be subdivided in a simple manner without resorting to the use of additional counter gears. The mechanism also avoids the necessity of using for each gear step an additional synchronizing device required in the known spur-gear speed-change mechanisms. This, in conjunction with the relatively low cost of a slide-gear mechanism, greatly facilitates giving a converter according to the invention any desired large number of gear steps.

C. SWITCHING BETWEEN FORWARD AND REVERSE OPERATION

Starting condition: idling.
Gear 26 is moved into engagement with M-gear 9.
C-gear 9b is moved into mesh with M-gear 9.
By selectively closing the friction clutches 71, 72 and 73, it is now possible to operate, as desired, between two reverse steps and the second forward step. However, the reversing mechanism, instead of being active through C-gear 9a, may also be arranged for coaction with C-gear 9b. Then, for maneuvering between forward and reverse, the clutches 71, 72 and 73, selectively operated, permit changing between the first two forward steps and one reverse step, the reverse step having the transmission ratio of the third forward gear step. However, a reversing gear may also be arranged at the C-gear 9a as well as at the C-gear 9b with the result of providing three reverse gear steps of graduated speed controllable only by selective operation of the clutches 71, 72 and 73.

By closing the clutch 74, when a C-gear of C-shaft 4b is "in," the O-shaft 3 can be braked or completely locked. This is of advantage, for instance, when a fluid or other torque-converting clutch, such as a Foettinger-clutch, is connected ahead of the converter mechanism. Then the closing of clutch 74 permits braking or eliminating the idling torque of the torque-converting coupling. However, the operation of clutch 74 is also useful for securely arresting a vehicle of whose propulsion plant the mechanism may form part, for instance in order to additionally lock the vehicle wheels when stopping or parking on a grade.

A comparison of the two above-presented tabulations shows that Table B, in reverse order, corresponds essentially to Table A. This means that the central control of the converter mechanism can be given a very simple design, for instance with the aid of an electric drum switch. Although according to Table B the clutch 71 is effective instead of the clutch 72 in Table A, this offers no difficulty for the design of the central control, as the signal transmission from the central control switch to these clutches may issue from a control cam, segment or the like which are alternately effective dependent upon the desired sense of progression. This also applies to the clutches 71 and 72 for providing synchronism of the respective C-shafts. The alternate operation of the friction clutches, made possible by the particular design principle of a converter mechanism according to the invention, permits such a transfer between the individual gear steps that the functioning of the mechanism, at least when switching upward from first to third gear, is virtually equal to that of a Foettinger clutch.

It may be mentioned that, for instance when using the converter on an automotive vehicle, no clutches are required outside of the converter.

In the embodiment according to Figs. 3 and 4, the I-shaft 2 is journalled in the converter housing 1 in alignment with the O-shaft 3 and in parallel relation to the C-shafts 4a and 4b. Mounted on the squared portion 8 of C-shaft 4a are two C-gears 9a and 11a joined to a single unit. The corresponding portion 8 of C-shaft 4b carries the C-gears 10b and 12b which are likewise joined together to form a unit. The gear units are displaceable relative to respective shafts 4a and 4b. Mounted on the O-shaft 3 are the M-gears 9, 10, 11 and 12. These gears have downwardly graduated numbers of teeth in the sequence just given. The C-gears denoted by the same numeral as the appertaining M-gear (for instance, 9a and 9, 10b and 10) are brought into meshing engagement with the M-gear by axial displacement and form the individual steps of the speed-change mechanism.

Another spur gear 77 is firmly mounted on the C-shaft 4b in the plane of the largest M-gear 9. Journalled in the converter housing 1 is further a shaft 25 on which a spur gear 26 is revolvably mounted and axially displaceable so that it can simultaneously mesh with M-gear 9 and spur gear 77 (see Fig. 4) and can thus serve as an intermediate gear for the reversing step. As in the embodiment of Fig. 1, a clutch 60 serves to provide for direct drive between I-shaft 2 and O-shaft 3 and is joined with the largest M-gear 9. O-shaft 3 is hollow. I-shaft 2 passes through hollow shaft 3 and has a profiled portion 59 on which the friction disc 58 of clutch 60 is non-rotatably mounted.

All axially displaceable spur gears of the speed-change mechanism are provided with annular grooves 13 by means of which they are shifted into and out of meshing engagement by means of gear-shift fork actuated by the central controller (not illustrated) of the converter.

The auxiliary mechanism of the converter is mounted in a separate portion of the converter housing 1 and provides two separate driving connections between I-shaft 4a. These two driving connections can alternately be switched on and off by means of friction clutches 71 and 72 mounted on C-shaft 4a. When one of the driving connections is in operation, the spur gear 62 on I-shaft 2 drives a spur gear 63 which is revolvably connected with the friction disc 67 of clutch 71. When the other driving connection is in operation, another spur gear 64 on I-shaft 2 drives a spur gear 65 which is revolvably journalled on C-shaft 4a and is non-rotatably joined with the disc 68 of clutch 72.

Two alternately operable driving connections are also provided between I-shaft 2 and C-shaft 4b, the selective control being effected by two friction clutches 73 and 74 secured to the C-shaft 4b. When one of these driving connections is in operation, the gear 62 drives a spur gear 76 which is revolvably mounted on C-shaft 4b and is non-rotatably joined with the friction disc 70 of clutch 74. When the other driving connection is effective, the gear 64 drives a spur gear 66 which is revolvable on C-shaft 4b and is non-rotatably connected with the friction disc 69 of clutch 73. The transmission ratios of the two gear pairs of which the spur gear 62 forms part are equal to each other. This also applies to the two gear pairs which have the gear 64 in common. In contrast thereto, the transmission ratios involving the spur gear 62 are related to those involving the spur gear 64 in accordance with the ratio 1:c, wherein the value c is identical with the constant c of the geometrical series of the respective transmission ratios between the sequential gear steps of the speed-change mechanism.

The operation of the converter according to the Figs. 3 and 4 will again be explained with reference to switching problems presented below in tabulated form.

D. SWITCHING FROM IDLING THROUGH ALL GEAR STEPS TO DIRECT DRIVE

Starting condition the same as in switching sequence A.
(9a in) = 1st step
72—92 (10 in, synchronized by 74) = 2nd step
73—10b (9a out, 11a in, synchronized by 71) = 3rd step
72—11a (10b out, 12b in, synchronized by 74) = 4th step
73—12b (11a out) = 5th step
60 = direct drive = 6th step

E. SWITCHING FROM DIRECT DRIVE THROUGH ALL GEAR STEPS TO IDLING

60 = 6th step
73—12b = 5th step
74—12b (11a in, synchronized by 72) = 4th step
71—11a (12b out, 10b in, synchronized by 73) = 3rd step
74—10b (11a, 9a in, synchronized by 72) = 2nd step
71—9a (10b out) = 1st step
9a out = idling It is apparent from Tables D and E that this converter, in contrast to the one according to Figs. 1 and 2, completes a gear change in each individual cycle. Consequently, this converter has single-cycle operation. The Tables D and E further show that the gear-switching operation of this converter is somewhat simpler than that according to Tables A and B. It also appears from Fig. 3 that this converter requires a smaller expenditure in structural components than the converter according to Fig. 1. That is, the converter of Fig. 3 has three spur gears less than the one of Fig. 1 and can be given considerably shorter lengths of the profiled portions 8 on the C-shafts. Nevertheless, with respect to ease of switching between gear steps, the simplified converter possesses the same advantageous properties as the one described with reference to Figs. 1 and 2.

In a converter of the type shown in Figs. 3 and 4, the number of gear steps can be increased or decreased as desired without changing the operating principle of basic design. Each M-gear with the mating C-gear represents one of the graduated steps of the speed-change mechanism.

F. SWITCHING BETWEEN FORWARD AND REVERSE

Spur gear 26 is to be shifted into mesh with M-gear 9 and spur gear 77 (Fig. 4); C-gear 9a is shifted into M-gear 9.

With this setting of the mechanism, the selective actuation of the clutches 71, 72, 73 and 74 permits operating with two forward gear steps and two reversing steps.

Figure 5:
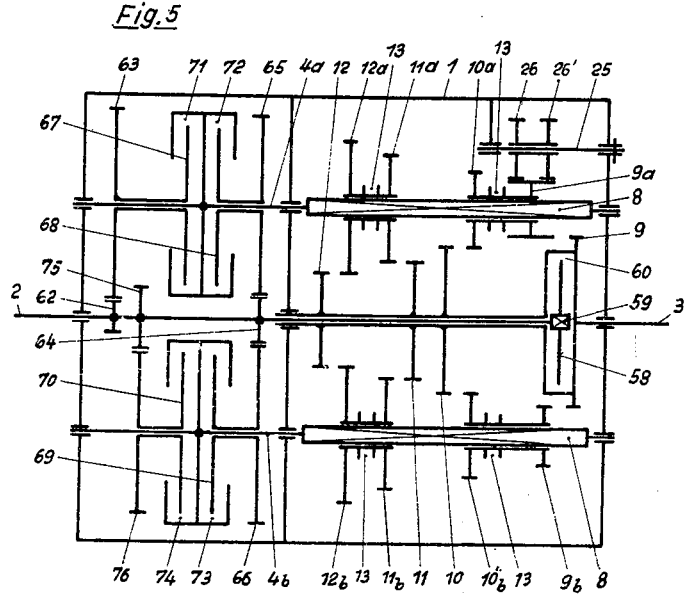
Fig. 5 shows schematically a longitudinal sectional view of a third converter.

In the embodiment of Fig. 5, the speed-change portion of the converter, located in the right-hand compartment of the housing 1, corresponds exactly to the corresponding mechanism portion in Fig. 1 with the only exception of an added C-gear 12b. Consequently, the above-presented description of Fig. 1 is applicable to the corresponding portion of Fig. 5. In Fig. 5, the auxiliary mechanism, located in the left-hand portion of the converter housing, is similar to the corresponding mechanism in Fig. 1 in possessing for each C-shaft two separate driving connections alternately operable by means of friction clutches. The driving connections are similar to those shown in Fig. 3 with the exception of an additional spur gear 75 fixed on I-shaft 2 and meshing with the spur gear 76 of clutch 74. An essential difference from the converters previously described concerns the transmission ratios of the spur-gear pairs in the auxiliary mechanism. These transmission ratios are as follows:

The transmission of the spur gears 62/63 is related to that of the gears 64/65 in accordance with the ratio $1:\sqrt{c}$; the transmission of gears 64/65 is related to that of gear 64/65 in the ratio of 1:1; the transmission of gears 64/66 is related to that of gears 75/76 in accordance with $1:\sqrt{c}$. Consequently the transmission of gears 62/63 is related to that of gears 75/76 in accordance with the ratio of $1:\sqrt{(c)^2}=1:c$.

The performance of the converter will again best be understood from the following presentation, in tabulated form, of several switching problems.

G. SWITCHING FROM IDLING THROUGH ALL GEAR STEPS TO DIRECT DRIVE

Initial condition the same as with switching Problem A. (9a in).

71—9a=1st step
72—9a (9b in, synchronized by 73)=2nd step
74—9b (9a out, 10a in, synchronized by 71)=3rd step
72—10a (9a out, 10b in, synchronized by 73)=4th step
74—10b (10a out, 11a in, synchronized by 71)=5th step
72—11a (10b out, 11b in, synchronized by 73)=6th step
74—11b (11a out, 12a in, synchronized by 71)=7th step
72—12a (11b out, 12b in, synchronized by 73)=8th step
74—12b=9th step
60=direct drive=10th step

H. SWITCHING FROM DIRECT DRIVE THROUGH ALL GEAR STEPS DOWN TO IDLING

60=10th step
74—12b=9th step
73—12b=8th step
71—12a (12b out, 11b in, synchronized by 74)=7th step
73—11b (12a out, 11a in, synchronized by 72)=6th step
71—11a (11b out, 11b in, synchronized by 74)=5th step
73—10b (11a out, 10a in, synchronized by 72)=4th step
71—10a (10b out, 9b in, synchronized by 74)=3rd step
73—9b (10a out, 9a in, synchronized by 72)=2nd step
71—9a (9b out)=1st step
(9a out)=idling As is apparent from Tables G and H, a converter according to Fig. 5 has the advantage of possessing a very large number of gear steps in comparison with the number of gears. The ten steps of transmission obtained require a number of gears only slightly larger than the number of gears in the six-step converter according to Fig. 1. However, even in a four-step speed-change mechanism the type of converter according to Fig. 5 is advantageous in reducing the required expenditure in structural components.

It will further be recognized that the embodiment according to Fig. 5 operates in single-cycle operation, each switching cycle involving a complete change between gear steps. Fundamentally, a converter according to Fig. 5 is based upon the same principle as those described previously so that essentially the same conditions obtain relative to switching operations and switching conditions, as well as the same basic advantages. For each of the embodiments described, further clutches in the train of power transmission from prime mover to load are unnecessary thus permitting a direct connection of the converter to an engine or other drive motor.

J. SWITCHING BETWEEN FORWARD AND REVERSE

C-gear 26' is moved in.
C-gear 9b is moved in.
Simply by alternately actuating the clutches 71, 72, 73 and 74, two forward speeds and two reverse speeds are obtained.

Without departing from the fundamental operating principle, the clutches of the auxiliary gear mechanism or some of them may be mounted on the I-shaft 2 with the result of reducing the torque loading of the input shaft, as a rule, down to two to three times the amount needed in the embodiments illustrated in Figs. 1 to 5. Such a modification is satisfactory if sufficient space is available for the converter in the axial direction. This requirement cannot be satisfied in most cases so that the provision of a clutch on the C-shafts as described in the foregoing is usually preferable.

For use in cases where the torque to be transmitted is very high, the converters according to the invention may be modified in accordance with the embodiments illustrated in Figs. 6 to 9. In these embodiments, the auxiliary gear mechanism, aside from the friction clutches, is provided with two planetary gearings which subject the respective clutches to only a small portion of the torque to be transmitted to the one C-shaft in power-transmitting operation at a time. This permits using clutches of the type particularly suitable for large differences in rotating speed and corresponding smaller torques, as in the case, for instance, with electromagnetic and electro-inductive clutches. The auxiliary mechanisms illustrated in Figs. 6 to 9 can readily be substituted for those shown in Figs. 1 to 5. In the following description, the particular spur-gear speed-changing mechanism applicable with the auxiliary gear mechanism is indicated. The switching operations are the same as those described previously for the respective speed-changing mechanisms.

For permitting a simple and quick orientation on the basis of the illustrations and tabulations, the planetary-gear auxiliary mechanisms shown in Figs. 6 to 9 are explained with reference to the same reference characters as used with the preceding embodiments for analogous and functionally similar components. The functional similarity and exchangeability of the two types of auxiliary mechanisms is favorable for economical manufacture of such converters. As a result, for instance, the central control means and in some cases also the converter housing are universally applicable so that the two types of converters differ from each other essentially only by the interior components of the auxiliary mechanism.

In the auxiliary mechanism of Fig. 6, the C-shaft 4a is non-rotatably connected with the bridge member 28 of a planetary gearing coaxially aligned with the shaft. The planetary gearing comprises a sun gear 81a, planet gears 79 and an orbit gear 80a. The orbit gear 80a is revolvably mounted on the C-shaft 4a and is driven from the spur gear 64 on I-shaft 2 through a spur gear 65 firmly joined with the orbit gear. The sun gear 81a is connected with the profiled portion 81 of C-shaft 4a, which portion serves to entrain the discs 67 and 68 of the controllable friction clutches 71 and 72 respectively. Clutch 72, when in operation, connects sun gear 81a with orbit gear 80a to thus lock the planetary gearing in itself. In this case, the C-shaft 4a is joined with the I-shaft 2 as if the spur gear 65 were mounted on the planetary gearing, and there is no motion within the planetary gearing. The clutch 71 when in operation connects the sun gear 81a with the converter housing, thus arresting the sun gear. Then the planetary gearing has the effect of driving the C-shaft 4a at reduced speed. The interior transmission ratios of the planetary gearing are so chosen that the alternating actuation of the clutches 71 and 72 changes the transmission of the drive in the ratio 1:c. When both clutches are inactive, the drive of the C-shaft is interrupted.

The C-shaft 4b is non-rotatably connected with the bridge member 28b of a planetary gearing coaxially aligned with shaft 4b. The planetary gearing comprises a sun gear 81b, planet gears 79 and an orbit bear 80b. A friction clutch 73 of the same design as the clutch 71 operates to connect the clutch disc 79 with the converter housing, thus arresting the disc 69 as well as the sun gear 81b rigidly connected with the disc. Under such conditions, the C-shaft 4b is driven from I-shaft 2 through the intermeshing spur gears 64/66 and through the planetary gearing with the same transmission ratio as obtained when the C-shaft 4a is driven by operation of the clutch 71. When clutch 73 is off, the drive of C-shaft 4b is interrupted.

The above-described auxiliary mechanism according to Fig. 6 can be joined with the spur-gear speed-changing mechanism according to Fig. 5, but in this case operates somewhat differently as far as the individual switching operations during a consecutive sequence of gear shifting is concerned. The individual operations of a converter combining the auxiliary mechanism of Fig. 6 with a speed-changing mechanism of Fig. 5 are as follows:

K. SWITCHING FROM IDLING TO DIRECT DRIVE (9a in) = 1st step
71—9a = 2nd step
72—9a (10b in, synchronized by 73) = 2nd step
73—10b (9a out, 10a in, synchronized by 71) = 3rd step
72—10a (10b out, 11b in, synchronized by 73)
 = 3rd step
73—11b (10a out, 11a in, synchronized by 71)
 = 3rd step
72—11a (11b out, 12b in, synchronized by 73)
 = 4th step
73—12b (11a out, 12a in, synchronized by 71)
 = 4th step
72—12a (12b out) = 5th step
60 = direct drive = 6th step

L. SWITCHING FROM DIRECT DRIVE TO IDLING

60 = 6th step
72–12a = 5th step
71–12a (12b in, synchronized by 73) = 4th step
73–12b (12a out, 11a in, synchronized by 72) = 4th step
71–11a (12b out, 11b in, synchronized by 73) = 3rd step
73–11b (11a out, 10a in, synchronized by 72) = 3rd step
71–10 (11b out, 10b in, synchronized by 73) = 2nd step
73–10b (10b out, 9a in, synchronized by 72) = 2nd step
71–9a (10b out) = 1st step
9b out = idling

M. SWITCHING BETWEEN FORWARD AND REVERSE

Spur gear 26′ is moved into M-gear 9.
C-gear 9b is moved into M-gear 9.
By selectively actuating the clutches 71, 72 and 73, one forward speed and two reverse speeds are obtained.

As is apparent from a comparison of Tables K and M with Tables A and B, the externally manifested operating properties of the converter according to Fig. 6 in conjunction with a speed-change mechanism according to Fig. 5 fully correspond to those of the two-cycle converter according to Fig. 1. There is again the possibility, described with reference to Fig. 1, of braking the C-shaft 4b against the converter housing (not illustrated), for instance by providing an additional friction clutch between the planetary-gear bridge member and the converter housing.

The embodiment of Fig. 7 represents another example of an auxiliary gear mechanism equipped with planetary gearings.

Relative to the drive of C-shaft 4a, the embodiment of Fig. 7 is identical with that of Fig. 6. Different, however, in Fig. 7 is the drive for C-shaft 4b. The spur gear 64 drives a spur gear 66 which is rigidly connected with the orbit gear 80b and is journalled together with the orbit gear for revolution about the C-shaft 4b. The bridge member 28b of the planetary gearing is non-rotatably connected with the C-shaft 4b, and the planet gears 79 journalled on the bridge member are simultaneously in meshing engagement with the orbit gear 80b and with the sun gear 81b. The sun gear 81b is non-rotatably connected with the friction disc 69 of clutch 73. By means of clutch 73, the disc 69 can be connected with the orbit gear 80b thus locking the entire planetary gearing within itself so that then the drive of C-shaft 4b is effected as if the spur gear 66 were rigidly connected with shaft 4b. The C-shaft 4b has a squared portion 82 non-rotatably connected with the friction disc 70 of the controllable friction clutch 74. By operating the clutch 74, the C-shaft 4b can be braked or locked against the converter housing 1. The clutch 73 permits interrupting the drive of the C-shaft 4b.

Since the drive of the C-shaft 4b has always a single transmission ratio determined by the gear pair 64/65, the performance of the auxiliary mechanism according to Fig. 7 corresponds fully to that of the auxiliary mechanism in the converter of Fig. 1. Consequently, the switching performance in two-cycle operation represented by Tables A, B and C is applicable to the embodiment last described.

In the embodiment shown in Fig. 8, the respective drives of the two C-shafts are exactly like and correspond fundamentally to the drive for the C-shaft, 4a in the embodiment of Fig. 6. Consequently, there is the possibility of selectively connecting the two sun gears 81a and 81b by operation of the respective clutches 71, 72 and 73, 74 either with the orbit gear 80a or 80b, or with the converter housing; and there is also the possibility of interrupting the drive of the C-shaft 4a, 4b by opening the clutches. The alternating closing of the clutches 71 and 72 or 74 and 73 has the effect that each time the transmission ratio of the drive for the C-shaft 4a changes in the ratio 1:c, this ratio being the same for both C-shafts when the two clutches 71, 74 or the clutches 72, 73 are simultaneously closed.

As regards to external operation, this auxiliary mechanism is in accordance with the one shown in Fig. 3 and can readily be substituted for the one shown in Fig. 3 to cooperate with the speed-change portion of the converter. The operation is then in accordance with the Tables D, E and F, involving single-cycle performance.

In the embodiment of Fig. 9, the arrangement of the clutches and planetary gearing is exactly in accordance with Fig. 8. However, the orbit gears 80a and 80b of the two planetary gearings are driven through two different spur gears 62 and 64 of the I-shaft, the transmission of gear pairs 62/63 being related to that of gear pairs 64/66 in accordance with the ratio 1:c. By alternating actuation of the clutches 71, 72 or 73, 74 the driving transmission ratios for the respective C-shafts are changed in the ratio of $1:\sqrt{c}$.

As regards to its external performance, this auxiliary mechanism corresponds to the one shown in Fig. 5. Accordingly, it requires single-cycle switching performance and possesses the same advantage of requiring few gears for a relating large number of speed-change steps.

It will be obvious to those skilled in the art, upon a study of this disclosure, that my invention permits of various modifications and may be embodied in specific designs other than those herein particularly illustrated and described, without departing from the essential features of the invention and within the scope of the claims annexed hereto.

I claim:

1. A mechanical power converter, comprising an input shaft, an output shaft, a plurality of counter shafts parallel to each other and to said output shaft; a speed-change mechanism having groups of intermeshable gears of fixed transmission-ratio graduation from group to group, each group having a main gear on said output shaft and selectively operable counter gear on said respective counter shafts; an auxiliary mechanism connecting said input shaft with said respective counter shafts and having two selectively operable gear transmissions in parallel between said input shaft and a predetermined one of said counter shafts, said two gear transmissions having spur gear pairs of different respective transmission ratios with the same graduation as said speed-change groups, said auxiliary mechanism comprising slip clutch means including respective controllable double main clutches, one side of each of said clutches being connected to a respective one of said counter shafts and the other side thereof being connected to said input shaft through a respective one of said spur gear pairs for continuously varying the speed of said predetermined one counter shaft through the range determined by said graduation.

2. A mechanical power converter, comprising an input shaft, an output shaft, a plurality of counter shafts parallel to each other and to said output shaft; a speed-change mechanism having groups of intermeshable gears of fixed transmission-ratio graduation from group to group, each group having a main gear on said output shaft and selectively operable counter gears on said respective counter shafts; an auxiliary gear mechanism connecting said input shaft with said respective counter shafts and having selectively operable gear transmissions of which two are in parallel between said input shaft and one of said counter shafts whereas a third transmission connects said input shaft with another one of said counter shafts, said two parallel transmissions having spur gear pairs of respective transmission ratios with the same graduation as said speed-change groups, said third transmission having a transmission ratio equal to that of one of said parallel transmissions, and said auxiliary mechanism comprising controllable slip clutch means including respective controllable double main clutches in each of said three transmissions, one side of each of said clutches being connected to a respective one of said counter shafts and the other side thereof being connected to said input shaft through a respective one of said spur gear pairs.

3. A mechanical power converter, comprising an input shaft, an output shaft aligned with said input shaft, two counter shafts parallel to each other and to said output shaft and equally spaced from said output shaft; a speed-change mechanism having groups of intermeshable gears of fixed transmission-ratio graduation from group to group, each group having a main gear on said output shaft and selectively operable counter gears on said respective counter shafts, said counter gears in each group having the same size; an auxiliary gear mechanism connecting said input shaft with said respective counter shafts and having selectively operable gear transmissions of which two are in parallel between said input shaft and one of said counter shafts whereas a third transmission connects said input shaft with the other counter shaft, said two parallel transmissions having spur gear pairs of respective transmission ratios with the same graduation as said speed-change groups, said third transmission having a transmission ratio equal to that of one of said parallel transmissions and having a driving spur gear in common with said one parallel transmission, said common spur gear being mounted on said input shaft, and said auxiliary mechanism comprising controllable slip clutch means including respective controllable double main clutches in each of said three transmissions, one side of each of said clutches being connected to a respective one of said counter shafts and the other side thereof being connected to said input shaft through a respective one of said spur gear pairs.

4. In a mechanical power converter according to claim 1, said counter gears being axially displaceable on said counter shafts for engagement and disengagement with said respective main gears, said inter-engageable counter gears and main gears having bevelled tooth edges, there being peripheral clearance in the direction of rotation to prevent mutual locking of main and counter gears due to occurrence of tooth-upon-tooth relation during synchronous run of both gears.

5. In a mechanical power converter according to claim 1, said counter gears being axially displaceable on said counter shafts for engagement and disengagement with said respective main gears, and the transmission ratio of one of said two gear transmissions in the auxiliary mechanism being slightly different from the value required for perfect peripheral synchronism between said main gears and said counter gears, whereby detrimental tooth-upon-tooth relation of the gears to be placed into meshing engagement is prevented.

6. A mechanical power converter according to claim 3, comprising a reversing mechanism having a reversing spur gear which, when in active condition, simultaneously engages one of said main gears and one of said counter gears of the same group, the counter shaft other than the one carrying said one counter gear having its lowest-speed group of gears in mesh simultaneously with said active condition of said reversing spur gear.

7. A mechanical power converter, comprising an input shaft, an output shaft axially aligned with the input shaft, clutch mechanism for direct drive of the output shaft by the main shaft, a plurality of counter shafts parallel to each other and to said input and output shafts; a speed-change mechanism having groups of intermeshable gears of fixed transmission-ratio graduation from group to group, each group having a main gear on said output shaft and selectively operable counter gears on said respective counter shafts; an auxiliary gear mechanism connecting said input shaft with said respective counter shafts and having selectively operable gear transmissions of which two are in parallel between said input shaft and one of said counter shafts whereas a third transmission connects said input shaft with another one of said counter shafts, said two parallel transmissions having spur gear pairs of respective transmission ratios with the same graduation as said speed-change groups, said third transmission having a transmission ratio equal to that of one of said parallel transmissions, said spur gear pairs being respectively immobile in the axial direction on the input and respective counter shafts, and said auxiliary mechanism including controllable double main clutches in each of said three transmissions, one side of each of said clutches being connected to a respective one of said counter shafts and the other side thereof being connected to said input shaft through a respective one of said spur gear pairs to selecitvely couple and uncouple a respective one of said three transmissions to the counter shafts.

8. A mechanical power converter, comprising an input shaft, an output shaft axially aligned with said input shaft, clutch mechanism for direct drive of the output shaft by the main shaft, two selectively activated counter shafts parallel to each other and to said output shaft and equally spaced from said output shaft; a speed-change mechanism having groups of intermeshable gears of fixed transmission-ratio graduation from group to group, each group having a main gear on said output shaft and selectively operable counter gears on said respective counter shafts, said counter gears in each group having the same size; an auxiliary gear mechanism connecting said input shaft with said respective counter shafts and having selectively operable gear transmissions of which two are in parallel between said input shaft and one of said counter shafts whereas a third transmission connects said input shaft with the other counter shaft, said two parallel transmissions having spur gear pairs of respective transmission ratios with the same graduation as said speed-change groups, said third transmission having a transmission ratio equal to that of one of said parallel transmissions and having a driving spur gear in common with said one parallel transmission, said common spur gear being mounted on said input shaft, said spur gear pairs being respectively immobile in the axial direction on the input and respective counter shafts, and said auxiliary mechanism including controllable double slip clutch means in each of said three transmissions, one side of each of said clutches being connected to a respective one of said counter shafts and the other side thereof being connected to said input shaft through a respective one of said spur gear pairs to selectively couple and uncouple a respective one of said three transmissions to the counter shafts.

9. A mechanical power converter, comprising an input shaft, an output shaft axially aligned with said input shaft, clutch mechanism for direct drive of the output shaft by the main shaft, two selectively activated counter shafts parallel to each other and to said output shaft and equally spaced from said output shaft; a speed-change mechanism having groups of intermeshable gears of fixed transmission-ratio graduation from group to group, each group having a main gear on said output shaft and selectively operable counter gears on said respective counter shafts, said counter gears in each group having the same size; an auxiliary gear mechanism connecting said input shaft with said respective counter shafts and having selectively operable gear transmissions of which two are in parallel between said input shaft and one of said counter shafts whereas a third transmission connects said input shaft with the other counter shaft, said two parallel transmissions having spur gear pairs of respective transmission ratios with the same graduation as said speed-change groups, said third transmission having a transmission ratio equal to that of one of said parallel transmissions and having a driving spur gear in common with said one parallel transmission, said common spur gear being mounted on said input shaft, said spur gear pairs being respectively immobile in the axial direction on the input and respective counter shafts, and said auxiliary mechanism including controllable double slip clutch means in said two parallel transmissions, one side of each of said clutches being connected to a respective one of said counter shafts and the other side thereof being connected to said input shaft through a respective one of said spur gear pairs to selectively couple and uncouple a respective one of said two parallel transmissions to the countershafts, and further comprising a reversing mechanism having a reversing spur gear arranged so that when in active condition, it simultaneously engages one of said main gears and one of said counter gears of the same group, the counter shaft other than the one carrying said one counter gear having its lowest-speed group of gears in mesh simultaneously with said active condition of said reversing spur gear.

10. A mechanical power converter, comprising an input shaft, an output shaft, a plurality of counter shafts parallel to each other and to said output shaft; a speed-change mechanism having groups of intermeshable gears of fixed transmission-ratio graduation from group to group, each group having a main gear on said output shaft and selectively operable counter gears on said respective counter shafts; an auxiliary mechanism connecting said input shaft with said respective counter shafts and having two selectively operable gear transmissions in parallel between said input shaft and a predetermined one of said counter shafts, said two gear transmissions having spur gear pairs of different respective transmission ratios with the same graduation as said speed-change groups, said auxiliary mechanism comprising slip clutch means including respective controllable double main clutches, one side of each of said double main clutches being connected to a respective one of said counter shafts and the other side thereof being connected to said input shaft through a respective one of said spur gear pairs, for continuously varying the speed of said predetermined one counter shaft through the range determined by said graduation, stationary supporting structure on which said mechanisms are mounted, and a controllable brake between said structure and one of said counter shafts of said auxiliary mechanism for braking and locking said latter counter shaft relative to said structure.

11. A mechanical power converter, comprising an input shaft, an output shaft, a plurality of counter shafts parallel to each other and to said output shaft; a speed-change mechanism having groups of intermeshable gears of fixed transmission ratio graduation from group to group, each group having a main gear on said output shaft and selectively operable counter gears on said respective counter shafts; an auxiliary mechanism connecting said input shaft with said respective counter shafts and having two selectively operable gear transmissions between said input shaft and a predetermined one of said counter shafts, said two gear transmissions having different respective transmission ratios with the same graduation as said speed-change groups, said auxiliary mechanism comprising slip clutch means including respective controllable double main clutch means, one side of said double clutch means being connected to a respective one of said counter shafts, and the other side thereof being connected to said input shaft through a respective one of said gear transmissions for continuously varying the speed of said predetermined one of said counter shafts through the range determined by said graduation.

References Cited in the file of this patent

UNITED STATES PATENTS

| | | |
|---|---|---|
| 2,386,540 | Campodonico | Oct. 9, 1945 |
| 2,633,753 | Campodonico | Apr. 7, 1953 |
| 2,757,557 | Hoffman | Aug. 7, 1956 |
| 2,772,582 | Gerst | Dec. 4, 1956 |

FOREIGN PATENTS

| | | |
|---|---|---|
| 943,922 | Germany | June 1, 1957 |